(12) United States Patent
Asano et al.

(10) Patent No.: US 6,583,531 B1
(45) Date of Patent: Jun. 24, 2003

(54) MOTOR WITH PERMANENT MAGNET (75) Inventors: Yoshinari Asano, Takefu (JP); Takao Sawahata, Takefu (JP); Yukio Honda, Katano (JP); Takahisa Kurahayashi, Fujisawa (JP); Toshiyuki Tamamura, Kadoma (JP); Hiroyuki Kiriyama, Hirakata (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/979,516
(22) PCT Filed: May 19, 2000
(86) PCT No.: PCT/JP00/03207
§ 371 (c)(1),
(2), (4) Date: Apr. 8, 2002
(87) PCT Pub. No.: WO00/72427
PCT Pub. Date: Nov. 30, 2000

(30) Foreign Application Priority Data

May 21, 1999 (JP) .......................................... 11/141863

(51) Int. Cl.$^7$ ................................................. H02K 1/12
(52) U.S. Cl. ........................ 310/254; 310/257; 310/259; 310/258; 310/156
(58) Field of Search ................................ 310/254, 257, 310/258

(56) References Cited

U.S. PATENT DOCUMENTS

| 4,730,136 | A | | 3/1988 | Muller ...................... 310/68 R |
|---|---|---|---|---|
| 5,038,065 | A | * | 8/1991 | Matsubayashi et al. ..... 310/162 |
| 5,041,749 | A | * | 8/1991 | Gaser .......................... 310/156 |
| 5,148,090 | A | * | 9/1992 | Oku et al. .................... 318/107 |
| 5,170,083 | A | * | 12/1992 | Burgbacher .................. 310/51 |
| 5,331,245 | A | * | 7/1994 | Burgbacher et al. ......... 310/186 |
| RE35,763 | E | * | 4/1998 | Burgbacher .................. 310/51 |
| 5,757,100 | A | * | 5/1998 | Burgbacher .................. 310/186 |
| 6,049,153 | A | * | 4/2000 | Nishimaya et al. .......... 310/156 |
| RE37,576 | E | * | 3/2002 | Stephens et al. ............. 310/254 |

FOREIGN PATENT DOCUMENTS

| DE | 555100 | 7/1932 |
|---|---|---|
| EP | 0 564 759 A1 | 10/1993 |
| FR | 1523356 | 8/1968 |
| JP | 09103062 | 4/1997 |

* cited by examiner

*Primary Examiner*—Nestor Ramirez
*Assistant Examiner*—Leda Pham
(74) *Attorney, Agent, or Firm*—Rossi & Associates (57) ABSTRACT

A motor has a stator having a plurality of teeth for receiving windings, a yoke connected to each tooth, and a rotor having permanent magnets facing the stator. An inner wall surface of each tooth faces the rotor with an air-gap therebetween. Each tooth is separated from an adjacent tooth by a slot-open-section extending between a tailing end of the tooth and a leading end of the adjacent tooth. The inner wall surface of each tooth has an arc extending from a center of the slot-open-section toward the tailing end. The air-gap at the tailing end of each tooth is greater than the air-gap at the leading end of each tooth. The inner wall surface of each tooth includes a straight-line tailing section extending from the center of the slot-open-section toward the leading end. The straight-line tailing section extends tangentially from the arc.

10 Claims, 8 Drawing Sheets

MOTOR WITH PERMANENT MAGNET

TECHNICAL FIELD

The present invention relates to a motor with permanent magnets; and the motor can realize an operation of high efficiency and low noise. More particularly, a uniquely shaped air gap between teeth of a stator and a rotor of the motor lies at the heart of the present invention.

BACKGROUND ART

Figure 8:
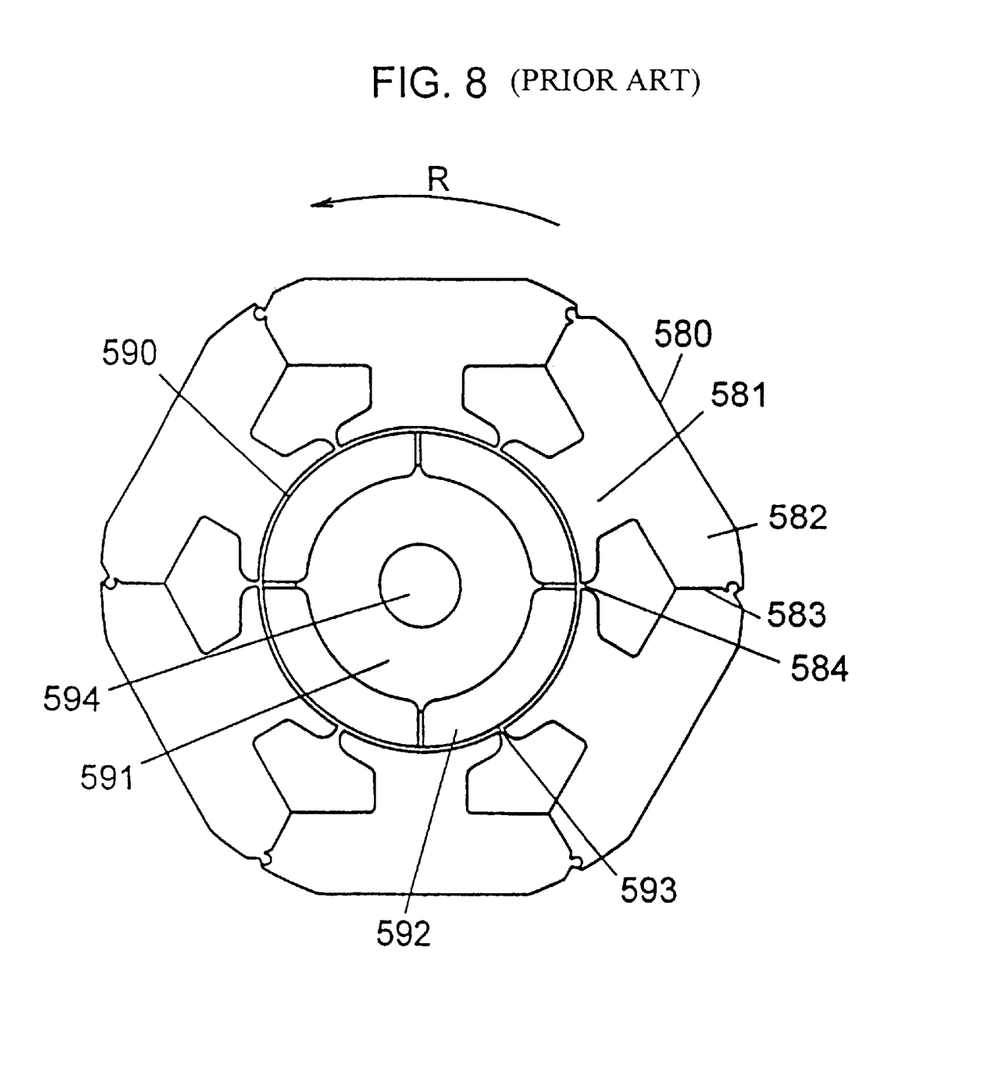
FIG. 8 is a cross section of a conventional motor.

FIG. 8 is a cross section of a conventional motor with permanent magnets.

In FIG. 8, stator 580 comprises the following elements:
six units including six teeth 581 with windings (not shown) and six yokes 582 connected to respective teeth 581; and these six units being coupled with each other at junctions 583 thereby forming a ring-shaped stator.

Wires can be wound on respective teeth 581 independently, so that the normal windings on teeth are achievable. As a result, a winding in a high density with less wire-wound-resistance is obtainable.

Rotor 590 comprises the following elements:
rotor core 591 shaped in an approx. cylinder;
shaft 594 disposed at the center of rotor core 591;
four pieces of permanent magnets 592 mounted on an outer wall of rotor core 591; and
tube 593 made of e.g. thin stainless steel and covering permanent magnets 592 for preventing the magnets from scattering.

In such a conventional motor as discussed above, the air gaps between respective teeth 581 and rotor 590 have approx. the same width as shown in FIG. 8.

Rotating magnetic field, produced by electric current travelling through the windings of stator 580, rotates rotor 590 on shaft 594. The rotating magnetic field is produced in this way: Adjacent teeth have different phases with each other and the stator's windings are thus three-phase-windings. In a regular operation, a driving circuit detects a position of the rotor and switches phases to be powered sequentially. In this case, each phase is powered every 120 electric angle, and yet one phase always remains non-powered, so that the rotating magnetic field is produced.

In the conventional motor with permanent magnets discussed above, opposite magnetic fields are produced between the adjacent teeth of active two pairs of windings out of six teeth. Therefore, magnetic flux at slot-open-section 584 is vulnerable to short-circuit. The slot-open-section is a clearance between the tips of the adjacent two teeth, and an opening section of a slot formed by the adjacent two teeth.

Figure 9:
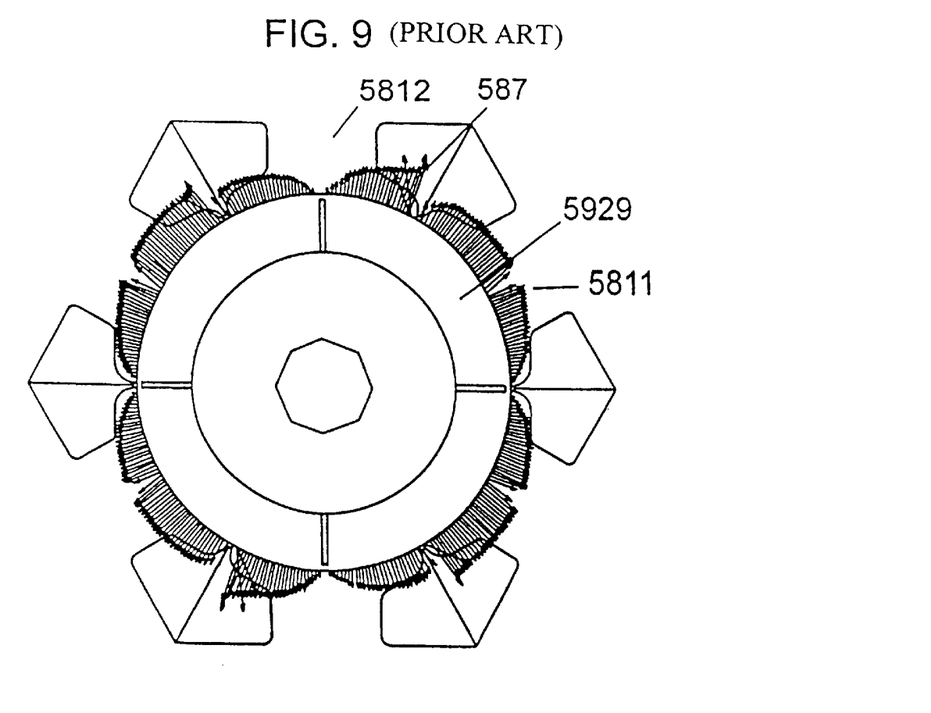
FIG. 9 shows Maxwell's stress distribution of the conventional motor.

FIG. 9 shows Maxwell's stress distribution produced at the air gap in the motor discussed above. The arrow marks show. the stress distribution. The arrow marks indicate the distribution of forces which the magnetic flux at the air gap supplies to the stator. When permanent magnet 5929 is polarized S pole, electric current travels through the windings so that tooth 5811 is magnetized S pole and tooth 5812 is magnetized N pole. Then rotor 590 rotates in rotating direction R as shown in FIG. 8. In this case, strong attraction is produced between magnet 5929 (S) and tooth 5812 (N), thus stress 587 produced therebetween becomes greater discontinuously.

Figure 10:
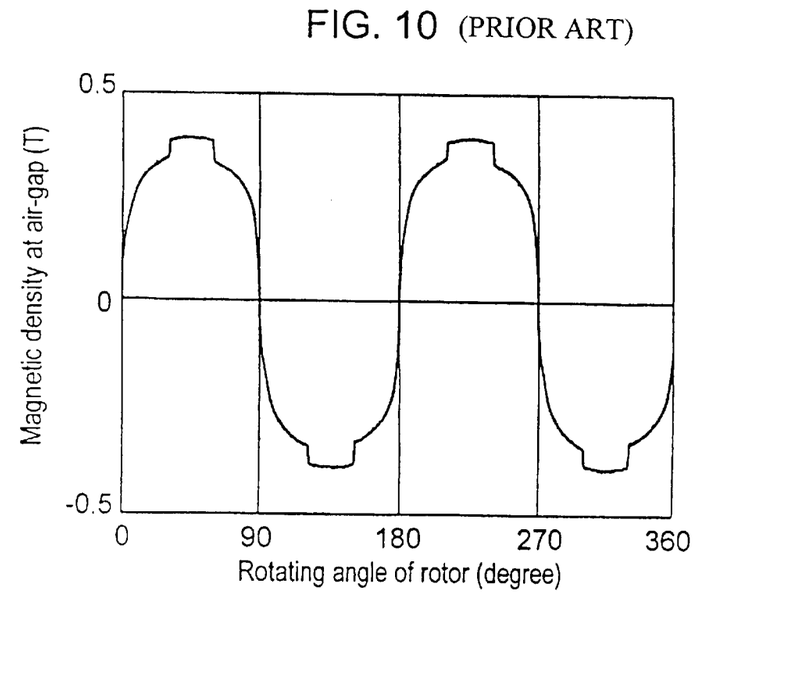
FIG. 10 illustrates variation of the magnetic-flux-density of the air gap around a slot-open-section of the conventional motor with respect to a rotating angle of the rotor.

FIG. 10 shows the way the magnetic-flux-density at the air gap around a slot-open in the motor changes with respect to a rotational angle of the rotor. In other words, FIG. 10 illustrates the time-based change of the magnetic-flux-density at the air gap around slot-open 584 in FIG. 8. In FIG. 10, the X-axis represents a rotational angle (mechanical angle) of rotor 590 in rotating direction R. When the magnetic-flux-density takes positive values, the rotor is polarized N pole, and when the density takes negative values, the rotor is S pole. The magnetic-flux-density seems to vary smooth; however, it rises sharply in 20-degree range on rotational angle 45-degree. This sharp change corresponds to stress 587 shown in FIG. 9, where stress 587 becomes large discontinuously, and this causes vibrations and noises in the motor operation.

SUMMARY OF THE INVENTION

The present invention addresses the problems discussed above, and aims to provide a motor having air-gap, which is situated between the teeth of the stator and the rotor, so that noise lowers and withstanding force against demagnetization grows.

The motor of the present invention comprises the following elements:
(a) a stator including a plurality of teeth on which wires are wound and yokes coupling the teeth; and
(b) a rotor having permanent magnets and facing to the stator via an air-gap.

A part of the air-gap at rotating tail of the teeth facing to the rotor is formed to be larger than other parts of the air-gap. This structure prevents the magnetic-flux-density at the air-gap from sharply rising, thereby lowering vibrations and noises.

DESCRIPTION OF THE PREFERRED EMBODIMENTS

Exemplary embodiments of the present invention are demonstrated hereinafter with reference to the accompanying drawings.

Exemplary Embodiment 1

Figure 1:
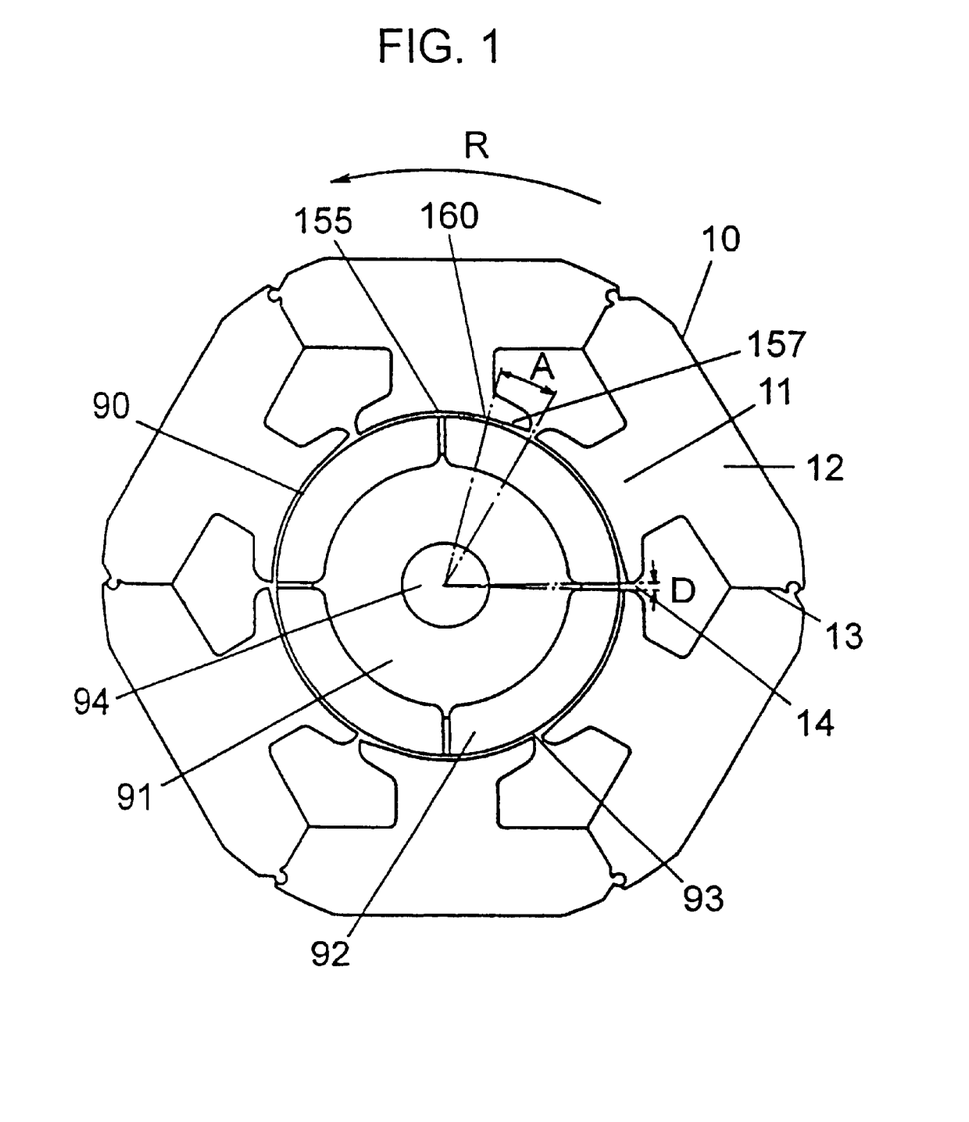
FIG. 1 is a cross section of a motor in accordance with a first exemplary embodiment of the present invention.

FIG. 1 is a cross section of a motor with permanent magnets in accordance with the first exemplary embodiment of the present invention.

In FIG. 1, stator 10 comprises the following elements:

A plurality of silicon-steel-sheets are laminated to form a piece of stator-core (hereinafter referred to as a divisional core). The divisional core includes tooth 11 and yoke 12 connected to tooth 11. A concentrated winding (not shown) is provided on tooth 11. Six divisional cores with windings are coupled to each other via junctions 13 to form a ring-shaped stator 10.

An inner wall of tooth 11 comprises the following elements:

arc 155 with respect to the rotational center of rotor 90, and flat section 157 being tangent to arc 155 at point 160 on the arc tip.

Arc 155 is drawn from point 160 to a leading section in rotating direction R, and flat section 157 is drawn from point 160 to a tailing section in rotating direction R. The width of air-gap at the tailing section is wider than that of the leading section. Point 160, bordering arc 155 and flat section 157, draws a line to the rotational center of rotor 90, and a center of slot-open-section 14 at the tailing section draws a line to the rotational center of rotor 90. These two lines form angle A, which is set at 15 degree. When a number of teeth is 3N and a number of rotor poles is 2N, angle A is defined by the following equation: A=(30/N) degree, where N is an integer not less than 1 (one).

Figure 3:
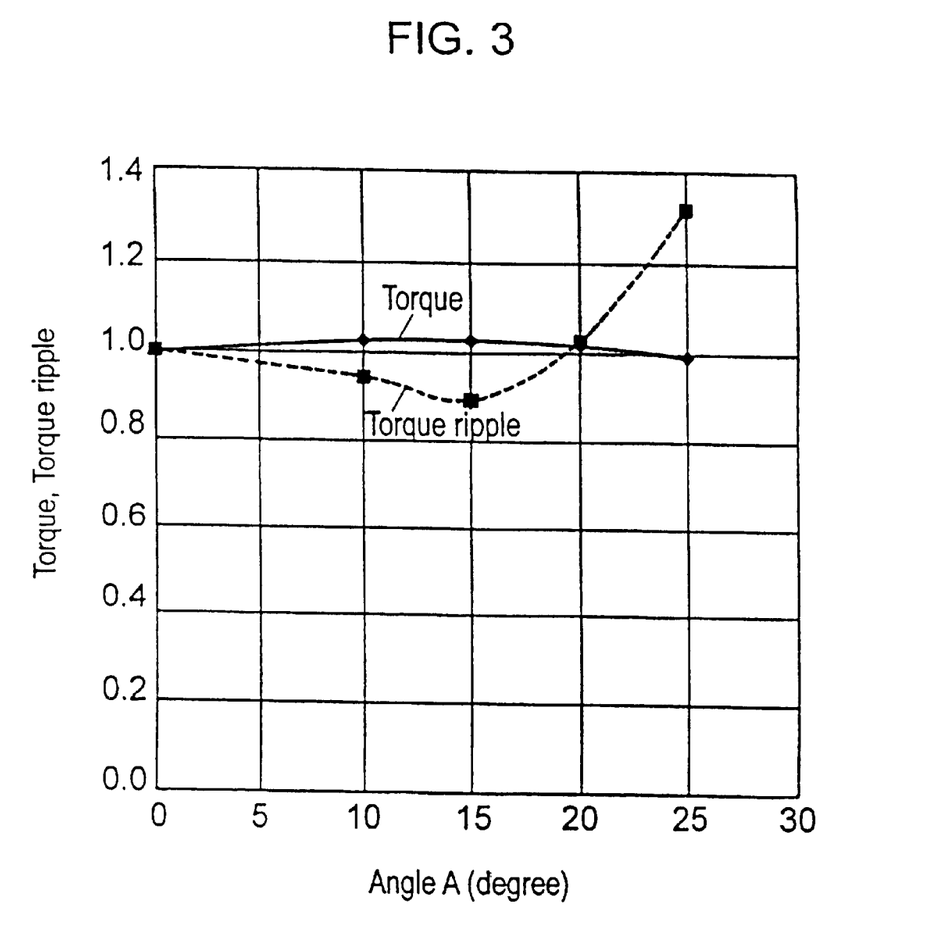
FIG. 3 shows relations between angle A shown in FIG. 1 and torque, as well as angle A and torque ripple.

FIG. 3 shows relations between angle A and torque, as well as angle A and torque ripple. These relations are normalized under the condition that torque and torque ripple take 1 (one) respectively at angle A=0 degree. Angle A=0 degree corresponds to the case when the air-gap keeps staying at an equal width as in a conventional motor. As shown in FIG. 3, the torque stays approx constant regardless of angle A, however, the torque ripple takes a minimum value at angle A=15 degrees. This advantage is obtainable with ease by powering the windings on the stator in a rectangular-wave 120degrees. Driving the motor in a sine-wave also effects this advantage to a some extent. A tolerance of angle A is preferably between A−D and A+D, where D is a an angle measured by the clearance between the edges of adjacent teeth with respect to the rotor center.

In FIG. 1, four permanent magnets 92 are fixedly mounted on an outer wall of rotor core 91—shaping in approx cylinder—of rotor 90. Magnets 92 are arranged to show N, S, N and S sequentially on the respective surfaces in rotating direction. Rims of respective magnets 92 are covered by tube 93 made of e.g. thin stainless-steel-sheet. Tube 93 prevents magnets 92 from scattering. Electric current running through the windings on the stator produces rotating-magnetic-field, and thus rotor 90 revolves on shaft 94.

Figure 2:
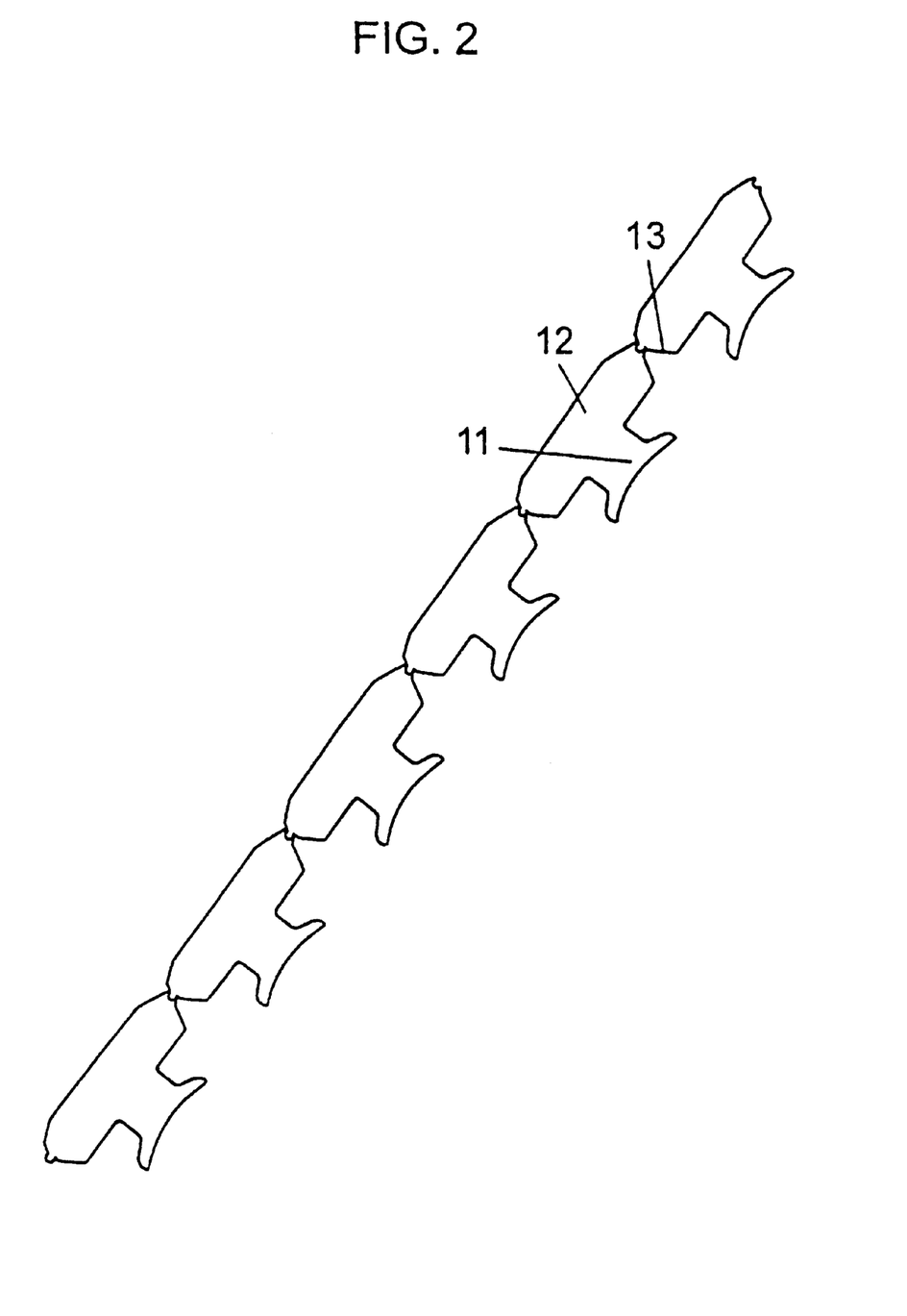
FIG. 2 is a developed view of a stator core of the motor shown in FIG. 1.

The wires on respective teeth of stator 10 are coiled in the following way: first, coil the wires on each divisional core, then bond the six divisional cores to form a ring. Another way of coiling is shown in FIG. 2: first, coil the wires on a strand of six divisional cores connected with junctions 13, then bond the strand to form a ring. The strand is not limited to include 6 divisional cores, but it may be more than 6 cores. After coiling the wires on each core, cut away a necessary piece of cores (in this first embodiment, 6 pieces are needed) from the strand, then bond the cut-away cores to form a ring.

These coiling methods is applicable in normal winding, therefore, a high-density-coiling as well as a low wire-wound-resistance is achievable. These coiling methods allow a clearance of the slot-open-section to be narrower than that by a conventional method. Angle D in this embodiment, therefore, can be smaller. Vibration as well as noises due to the rotating-magnetic-flux traveling through slot-open-section 14 can be thus reduced. The conventional coiling method is to insert a coiling nozzle through a slot-open-section of a stator-core that has formed a ring, then coil a wire on each tooth.

The windings form three-phase windings where adjacent teeth have different phases with each other. In a normal operation, a driving circuit switches phases to be powered sequentially by detecting a polarity of the rotor. In this case, each phase is powered every 120 electric angles, and yet, one phase always remains non-powered, thereby forming the rotating magnetic field.

In a conventional case, when a rotor polarity is opposite to a polarity produced by the current running through the windings on the stator teeth facing the rotor polarity, the magnetic-flux-density of air-gap at that place sharply rises as shown in FIG. 9. However, in this embodiment, flat section 157 corresponds to that place. Thus, the air-gap is widened so that the magneti-flux-density changes not sharply but moderately.

Figure 4:
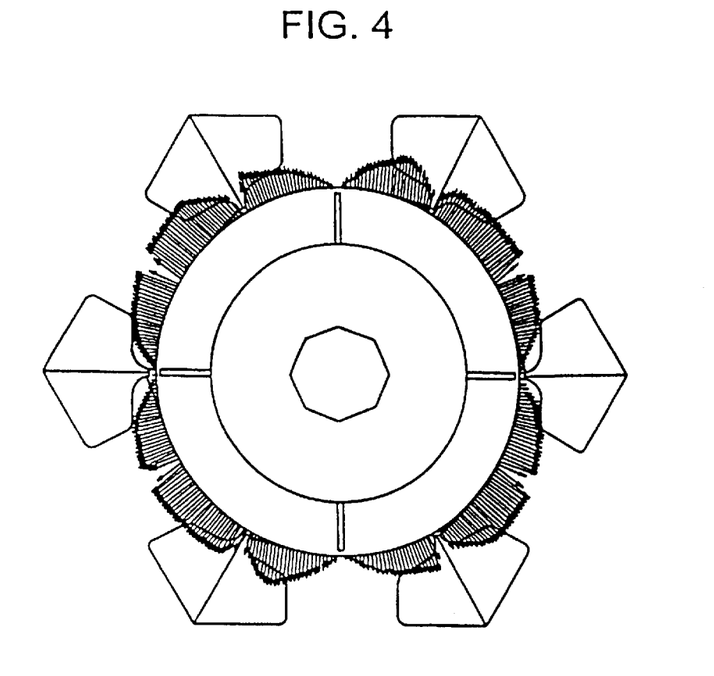
FIG. 4 shows Maxwell's stress distribution of the motor shown in FIG. 1.
Figure 5:
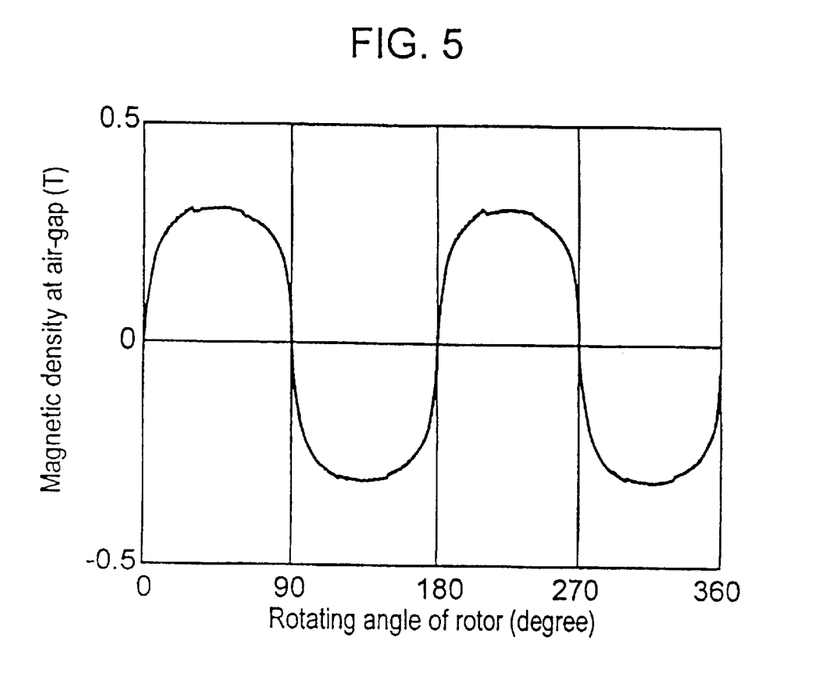
FIG. 5 illustrates variation of the magnetic-flux-density of the air gap around a slot-open-section of the motor shown in FIG. 1 with respect to a rotating angle of the rotor.

FIG. 4 illustrates Maxwell's stress distribution with arrow marks. The stress is produced at the air-gap of the motor in accordance with this first embodiment. FIG. 4 does not show the sharp rise of magnetic-flux-density as seen in the conventional case. FIG. 5 shows time-based diagram of the magnetic-flux-density of air-gap around slot-open-section 14. The X-axis represents a rotational angle (mechanical angle) of the rotor, and the graph shows a moderate change without any sharp turns. As a result, vibrations and noises can be reduced in the motor operation.

Exemplary Embodiment 2

Figure 6:
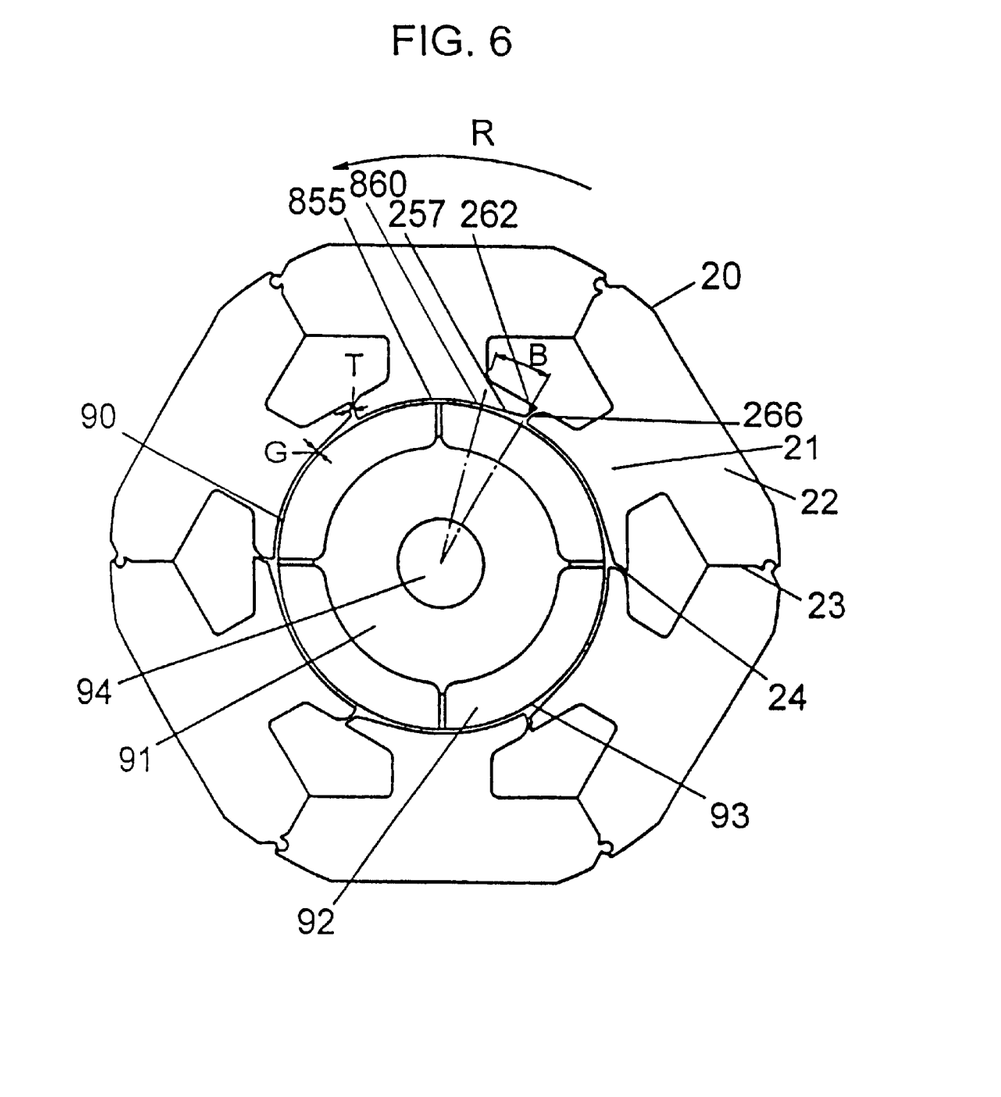
FIG. 6 is a cross section of a motor in accordance with a second exemplary embodiment.

FIG. 6 is a cross section of a motor in accordance with the second exemplary embodiment.

In FIG. 6, stator 20 comprises the following elements:

A divisional core includes tooth 21 and yoke 22 connected to tooth 21 as same as the first embodiment, and a concentrated winding (not shown) provided on tooth 21. Six divisional cores with windings are coupled to each other to form a ring-shaped stator 20. Rotor 90 has the same structure as that of the first embodiment, the description thereof is thus omitted here.

The second embodiment differs from the first one in the following points:

An inner wall of tooth 21 comprises the following elements:

arc 855 with respect to the rotational center of rotor 90, and flat section 257 being tangent to arc 855 at point 860 on the arc tip.

Arc 855 is drawn from point 860 to a leading section in rotating direction R, and flat section 257 is drawn from point 860 to a tailing section in rotating direction R. The width of air-gap at the tailing section is wider than that of the leading section.

In this second embodiment, tip 262 of tailing section of each tooth is formed closely to tip 266 of leading section of each adjacent tooth, and the distance between tip 262 and tip 266 is not more than the minimum value G of magnetic air-gap. The magnetic air-gap is a magnetic distance from a rotor's magnet or a rotor core to a stator, and when tube 93 made of non-magnetic material exists in between, the magnetic air-gap is a sum of a plate thickness of tube 93 and a mechanical air-gap. In FIG. 6, the mechanical air-gap is a spatial distance from the outer wall of tube 93 to the inner wall of tooth 21.

In the structure discussed above, the magnetic flux shorts at slot-open section 24 away from magnet 92 when a large current runs through the stator winding. As a result, influence of demagnetization to magnet 92 lowers, i.e. withstanding force of magnet 92 against demagnetization grows.

Point 860 bordering arc 855 and flat section 257 is preferably positioned at a place where flat section 257 forms 15 degrees of angle B with respect to the rotational center.

Exemplary Embodiment 3

Figure 7:
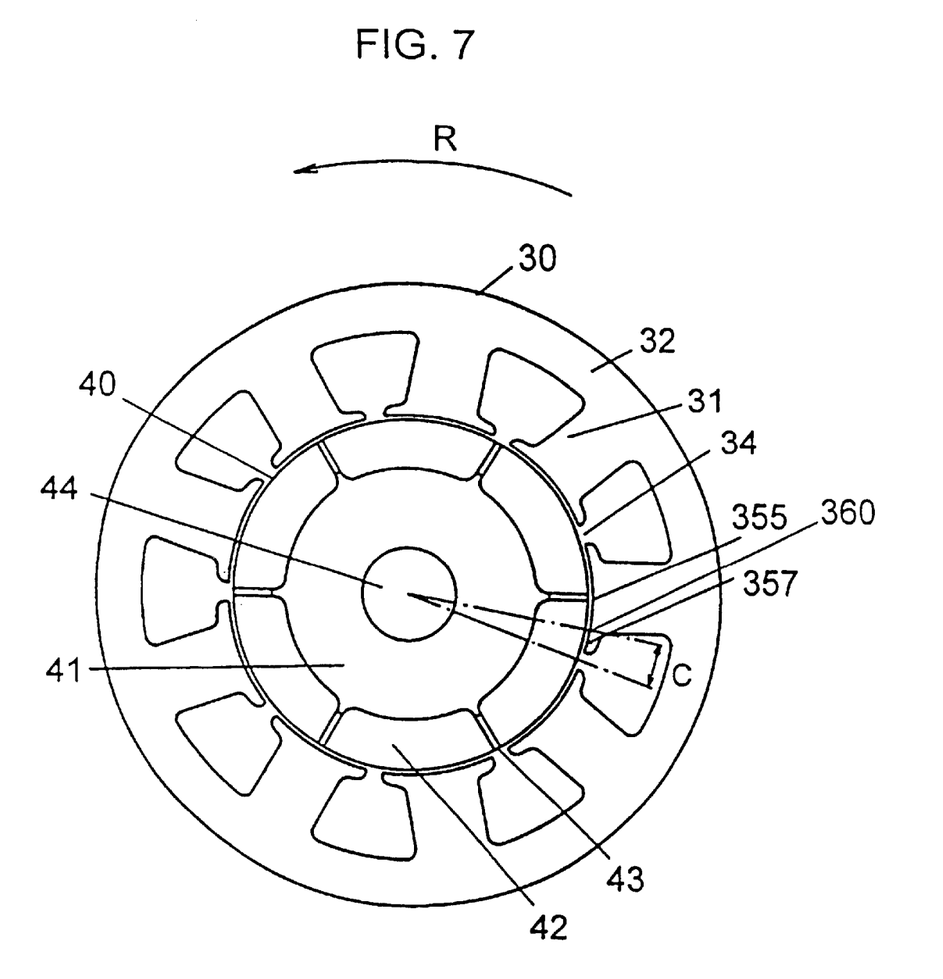
FIG. 7 is a cross section of a motor in accordance with a third exemplary embodiment.

FIG. 7 is a cross section of a motor with permanent magnets in accordance with the third exemplary embodiment of the present invention.

In FIG. 7, stator 30 is not divided—different from the first and second embodiments—and comprises nine pieces of teeth 31 and yoke 32 connecting the outer walls of teeth 31. Respective teeth 31 are coiled with wires (not shown).

Rotor 40 comprises rotor core 41 shaped in approx. a cylinder and six permanent magnets 42 fixedly mounted on the outer wall of rotor core 41. Magnets 42 are arranged to provide alternating polarities, i.e. showing N, S, N, S N, S sequentially on their surfaces in the rotating direction. Tube 43 covers the outer walls of magnets 42 in order to prevent magnets 42 from scattering. Electric current running through the windings on the stator produces rotating-magnetic-field, and thus rotor 40 revolves on shaft 44.

The air-gap between stator 30 and rotor 40 has two portions where tooth 31 faces to rotor 40, namely, one portion on the tailing section 357 in the rotating direction is wider than the other portion on another section 355.

A line between the center of shaft 44 of rotor 40 and the center of slot-open section 34 forms angle C with another line between the shaft center and point 360 from which the air-gap along the tailing section increases. When a number of teeth is 3N and a number of rotor poles is 2N, angle C is defined by the following equation: C=(30/N) degree, where N is an integer not less than 1 (one). Angle C is thus preferably 10 degrees.

This third embodiment describes a case when a number of teeth is greater than those of embodiment 1 and 2, or due to on-divided stator and the resultant windings, a width of a slot-open-section should be grater than those of embodiments 1 and 2. In such a case, a ratio of the slot-open-section-width vs. the width of tooth facing to the rotor becomes greater. Therefore, a ratio of a half of the slot-open-section-width vs. angle C becomes greater than those of embodiments 1 and 2. This structure allows an area, where the magnetic-flux-density of air-gap sharply rises, to be smaller than a case having a narrower slot-open. As a result, section 357 where an air-gap is greater than other sections may have a narrower width. This third embodiment can effect the same advantages as the first and second embodiments.

In the three embodiments discussed previously, a number of teeth is 6 and a number of polarities is 4, or 9 and 6 respectively. The stators divided together with teeth, and the non-divided stator have been demonstrated. Regarding the dividing method, separating the teeth and the yoke may be one of the dividing methods.

The motor may be an outer-rotor type, i.e. a rotor revolves around a stator. In such a case, an air-gap at a tailing section of a tooth should be also greater than the air-gap at other sections in order to obtain the same advantage as the previous embodiment. The following method is an example to form such a structure: an outer rim of a tooth of a stator is formed by an arc of the tooth and a local curvature having a smaller radius than the arc, where the arc's center is the same as the rotational center, and the arc is smoothly connected to the local curvature.

Grooves for welding, or subsidiary grooves for lowering vibrations and noises can be provided on the teeth facing to the rotor when necessary. A rotor having permanent magnets mounted on the outer wall of the rotor, i.e. a surface magnet type, can effectively lower the vibrations and noises. However, the present invention is also applicable to a rotor having the permanent magnets in the slots provided in the rotor-core, i.e. an interior magnet type.

Any driving methods and any position detectors can be employed without hurting the advantages of the present invention, and any modifications responsive to the present invention are still in the scope of the present invention.

A motor of the present invention, as discussed above, comprises the following elements:

a stator including a plurality of teeth having windings thereon and a yoke connecting the teeth; and a rotor having permanent magnets and facing to the stator via an air-gap.

The air-gap at a tailing section of each tooth in the rotational direction is greater than the air-gap at other sections. This structure prevents the magnetic-flux-density at the air-gap from rising sharply, thereby lowering vibrations and noises.

Further, the motor has 3N pieces of teeth on which concentrated windings are provided, and the rotor has 2N polarities, so that adjacent two teeth are magnetized heteropolar when their windings are powered. As a result, the concentration of the magnetic flux at a slot-open-section can be moderated.

Still further, the air-gap ranging 30/N degrees from the center of slot open-section on the tailing section is formed to be greater than the air-gap on other sections, so that the vibrations and noises can be more effectively reduced.

Yet still further, in an inner-rotor-type motor, an inner wall of each tooth shapes in an arc ranging 90/N degrees from the center of slot-open section at a leading section in the rotational direction. On the other hand, the remaining inner wall of each tooth shapes in a straight-line ranging 30/N degrees from the center of slot-open-section at a tailing section in the rotational direction. The structure, where straight-line is tangent to the arc at the point spaced 30/N degrees from the center of slot-open-section at the tailing section, can moderate a sharp change of the magnetic flux thanks to a smooth inner wall of each tooth.

A surface-mounted-magnets-type rotor can reduce the vibrations and noises more effectively.

Windings at a high density is obtainable in a stator formed by divided teeth, or in the teeth separated from a yoke, and yet, a shape of the slot-open-section has more flexibility in these types. As a result, further reduction of the vibrations and noises can be expected, and withstanding force against demagnetization is improved.

Another structure where the tips of adjacent two teeth are situated closely to each other and away from the air-gap allows the withstanding forth against demagnetization to grow. These tips are formed on the teeth facing to the rotor.

Still another structure where the tips are closely situated to each other spaced with not more than the minimum air-gap is more preferable.

Industrial Applicability

The present invention relates to a motor with permanent magnets, and the motor is expected to realize an operation of high efficiency and low noise. The motor comprises the following elements:

a stator including a plurality of teeth on which windings are provided and a yoke connecting the teeth; and a rotor having permanent magnets and facing to the stator via an air-gap.

The air-gap at a tailing section of each tooth facing to the rotor in the rotational direction is greater than the air-gap at other sections. This structure reduces vibrations and noises, which are produced by discontinuously growing magnetic-flux-density at the air-gap.

What is claimed is:

1. A motor of an inner-rotor type comprising:

a stator including a plurality of teeth for receiving windings, and a yoke connected to each tooth; and a rotor having permanent magnets facing said stator;

wherein an inner wall surface of each tooth faces said rotor with an air-gap therebetween, wherein each tooth is separated from an adjacent tooth by a slot-open-section extending between a tailing end of the tooth and a leading end of the adjacent tooth, wherein the inner wall surface of each tooth has an arc extending 90/N degrees from a center of the slot-open-section toward the tailing end, N representing an integer not less than 1, wherein the air-gap at the tailing end of each tooth is greater than the air-gap at the leading end of each tooth, wherein the inner wall surface of each tooth includes a straight-line tailing section extending 30/N degrees from the center of the slot-open-section toward the leading end, and wherein the straight-line tailing section extends tangentially from the arc.

2. The motor according to claim 1, wherein the number of teeth is 3N and the number of polarities of said rotor is 2N.

3. The motor according to claim 2, wherein the air-gap at the straight-line tailing section is greater than the air-gap at the arc.

4. The motor according to one of claims 1–3, wherein the rotor has a rotor core, and the permanent magnets are disposed on a wall of the rotor core.

5. The motor according to one of claims 1–3, wherein said stator is formed by piecing together a plurality of divisional cores, each divisional core comprising a tooth and a yoke connected to the tooth and by coupling a teeth section and a yoke section.

6. The motor according to claim 5, wherein the slot-open-section has a gap between the leading and tailing ends of adjacent teeth, the gap being closely spaced.

7. The motor according to claim 6, wherein the gap between the leading and tailing ends is not greater than a smallest width of the air-gap.

8. The motor according to claim 4, wherein said stator is formed by piecing together a plurality of divisional cores, each divisional core comprising a tooth and at yoke connected to the tooth and by coupling a teeth section and a yoke section.

9. The motor according to claim 8, wherein the slot-open-section has a gap between the leading and tailing ends of adjacent teeth, the gap being closely spaced.

10. The motor according to claim 9, wherein the gap between the leading and tailing ends is not greater than a smallest width of the air-gap.

* * * * *